United States Patent [19]

Shibano

[11] Patent Number: 4,807,251

[45] Date of Patent: Feb. 21, 1989

[54] PSK MODEM SYSTEM WITH IMPROVED DEMODULATION RELIABILITY

[75] Inventor: Yoshizo Shibano, Osaka, Japan

[73] Assignee: Sumitomo Electric Industries, Ltd., Osaka, Japan

[21] Appl. No.: 76,173

[22] Filed: Jul. 21, 1987

[30] Foreign Application Priority Data

Jul. 21, 1986 [JP] Japan .................................. 61-171338
Aug. 29, 1986 [JP] Japan .................................. 61-204643

[51] Int. Cl.$^4$ .......................................... H04L 27/18
[52] U.S. Cl. ......................................... 375/53; 375/54; 375/67; 375/85; 329/104
[58] Field of Search ................... 375/17, 20, 52, 53, 375/54, 55, 57, 67, 83, 84, 85, 86, 101; 329/104, 105, 110; 332/9 R, 10, 16, 21, 22

[56] References Cited

U.S. PATENT DOCUMENTS

| | | | |
|---|---|---|---|
| 3,032,745 | 5/1962 | Hamer | 375/56 |
| 3,242,262 | 3/1966 | Melas et al. | 375/119 |
| 3,419,804 | 12/1968 | Gorog et al. | 375/55 |
| 4,580,277 | 4/1986 | Angello et al. | 375/56 |
| 4,726,038 | 2/1988 | Ikegami et al. | 375/53 |

*Primary Examiner*—Benedict V. Safourek
*Attorney, Agent, or Firm*—Stevens, Davis, Miller & Mosher

[57] ABSTRACT

A modem system is disclosed which has an improved reliability of detection of PSK data using a simple signal delay detection scheme. A transmission signal is produced which has a phase reference portion provided at at least one of the front and rear portions of a time slot. In a first half of the remaining portion of the time slot the phase of the transmission signal changes stepwise in a first predetermined direction for a "mark" state while in a second half of the remaining portion it changes stepwise back to the reference value. For a "space" state the phase changes stepwise in a second predetermined direction, opposite the first, in the first half of the remaining portion and then in the second half it changes stepwise back to the reference value. In a second aspect of the invention only one of the two digital states causes a corresponding phase change while for the other state the transmission signal retains the phase reference value throughout the time slot.

12 Claims, 10 Drawing Sheets

PHASE DIF. $\Delta\theta$

PSK MODEM SYSTEM WITH IMPROVED DEMODULATION RELIABILITY

BACKGROUND OF THE INVENTION

1. Field of the Invention

This invention relates to modem systems, and more particularly to a modem system in which a PSK modulation is used for transmission of digital data and, on the signal receiving side, delay demodulation is used to obtain the original digital data.

2. Brief Discussion of the Art

In a conventional PSK digital signal transmission system, a signal to be transmitted is PSK-modulated on the signal transmitting side and, on the signal receiving side, the signal is demodulated to obtain the original digital data.

In PSK modulation systems, the digital signals "0" and "1" are transmitted in correspondence to the phase of a carrier, and the C/N ratio deterioration is minimized. Because of its excellent signal characteristics, the PSK modulation system is extensively employed for transmission of digital signals.

Figure 7:
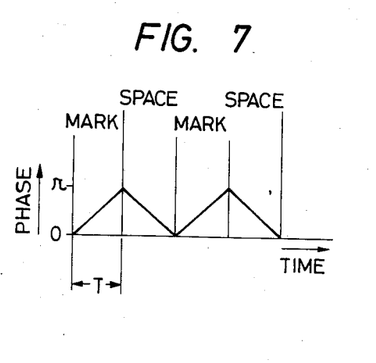
FIGS. 7 and 8 are diagrams showing signal patterns of conventional modulation systems.
Figure 8:
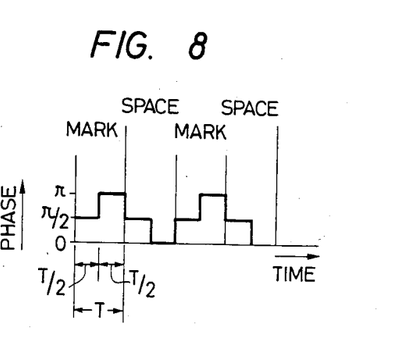

The PSK modulation system will be described in more detail. Usually one of a so-called MSK system, as shown in FIG. 7, or a so-called DSK system, as shown in FIG. 8, are employed for PSK modulation.

In the MSK system, when a signal is in "mark" state, the phase is linearly increased by 180° for one time slot period of the signal; and when the signal is in "space" state, the phase is linearly decreased by 180° for one time slot period.

In the DSK system, when a signal is in "mark" state, the phase is increased in two steps, i.e., one time slot period of the signal is divided into two parts and, in each part, the phase is increased by 90°; and when the signal is in "space" state, the phase is decreased in two steps, i.e., in each part, the phase is decreased by 90°.

The MSK system is advantageous in that the occupied bandwidth is small because the phase changes continuously. The DSK system is suitable for wideband data transmission, because it is substantially free from multi-path fading.

In general, a delay detection system or a synchronous detection system are employed for demodulation of the signals which are PSK-modulated as described above.

In the delay detection system, a signal received is divided into two parts. One part is applied directly to a phase comparator, while the other is supplied through a delay circuit to the phase comparator. In the delay circuit, the signal is delayed by one (1) or half ($\frac{1}{2}$) signal period of the modulation. Thus, by comparing the relatively delayed signals the PSK-modulated signal is demodulated into the original digital signal. This will be described in more detail with reference to FIGS. 5A, 5B and 5C.

Figure 5A:
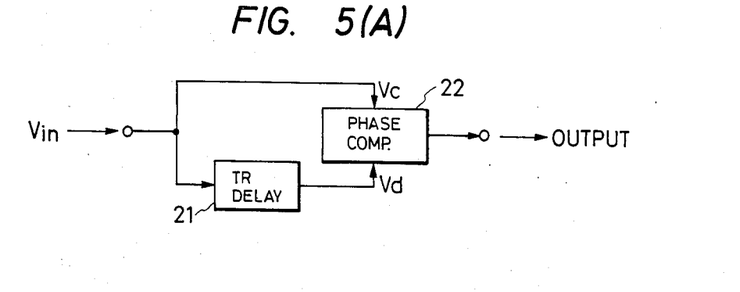
FIGS. 5(A), 5(B) and 5(C) show circuit diagrams and a phase characteristic for a conventional delay detection device.

It is assumed that, in a delay detection device shown in FIG. 5A, its input voltage is represented by the following equation:

$$V_{in} = \cos(\Omega t + \theta(t))$$

where $\theta$ is the angular frequency of the carrier, t is the time, and $\theta(t)$ is the phase modulation function. The input voltage $V_{in}$ is divided into two parts. One of the two parts is supplied to one input terminal of a phase comparator 22, and the other, after being delayed by a predetermined period of time TR by a delay circuit 21, is applied to the other input terminal of the phase comparator 22. Therefore, the signal $V_c$ applied to the one input terminal of the phase comparator is:

$$V_c = V_{in} = \cos(\Omega_t + \theta(t)),$$

while the signal $V_d$ supplied to the other input terminal of the phase comparator is:

$$V_d = \cos(\Omega(t-TR) + \theta(t-TR))$$

Figure 5B:
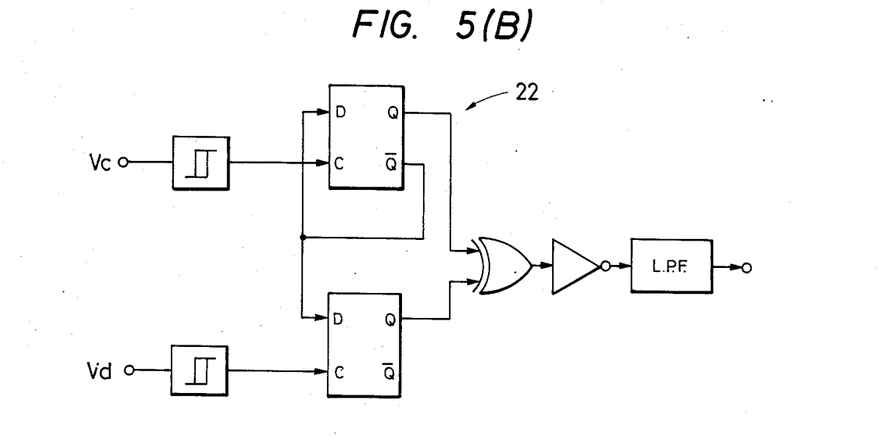

In the case where the phase comparator 22 is as shown in FIG. 5B; that is, the phase comparator 22 is such that the output is proportional to the phase difference of the input signals, then the phase difference is:

$$\Delta\theta = \Omega TR + \theta(t) - \theta(t-TR)$$

In the MSK system or in the DSK system, the delay time TR should be equal to T/2 (where T is one time slot of the signal).
With
$$\Omega TR = (2n-1)\pi$$

or $$\Omega = \pi/TR \ 32 \ (2n-1)2\pi/T,$$

a reference point for phase comparison can be set at the center of the range of operation of the phase comparator.

By way of further example, a DSK modulation system will be described in more detail; however, the description is applicable to the case of the MSK system as well.
When $$\theta(t) - \theta(t-TR) = 0,$$

$$\Delta\theta = \Omega TR = (2n-1).$$

Therefore, this point is the phase reference point in the case where there is no phase shift, and, the output provided corresponds to the point shifted by $\theta(t) - \theta(t-TR)$ from that point.

Figures 6A, 6B:
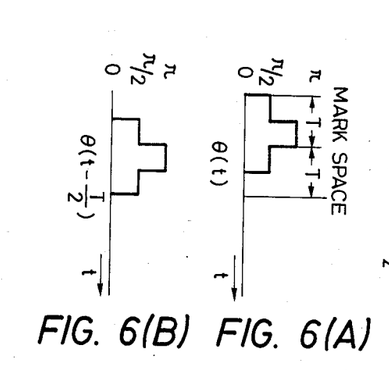
FIGS. 6(A), 6(B), 6(C), 6(D) and 6(E) are diagrams for a description of the operation of the delay detection device of FIGS. 5(A) and 5(B)

In the case of a mark-space signal, the phase function $\theta(t)$ is as indicated in FIG. 6A, and the function $\theta(t-T/2)$ in FIG. 6B.

Figure 6C:
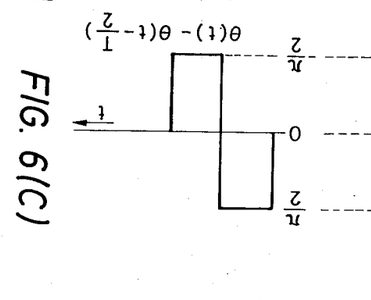
Figure 6D:
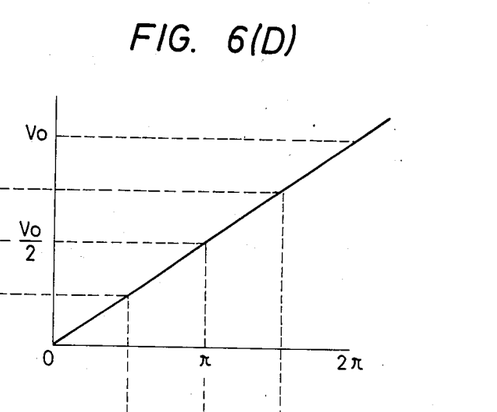
Figure 6E:
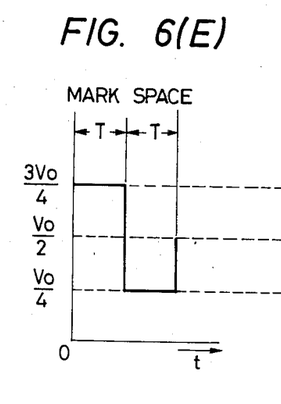

Accordingly, as shown in FIG. 6C, $\theta(t) - \theta(t-T/2)$ is $\pi/2$ for a "mark" period and a $-\pi/2$ for a "space" period, and an output waveform as shown in FIG. 6E is obtained according to an output characteristic indicated in FIG. 6D. That is, the output is 3 $V_0/4$ for a "mark" period and $V_0/4$ for a "space" period.

Therefore, it can be determined that the signal is the "mark" when the output of the phase comparator 22 exceeds $V_0/2$, and it is the "space" when the output is $V_0/2$ or less.

In a synchronous detection circuit, an input signal is divided into two parts which are supplied to two phase comparators, respectively, and the output signal (having a frequency coincident with the carrier frequency of the input signal) of a voltage-controlled oscillator included in a phase synchronization loop is applied, as it is, to one of the phase comparators, while the output signal, after being shifted 90° in phase, is supplied to the other phase comparator, so that the original digital signal is obtained by utilization of the output signals of the two phase comparators (cf. Trans. IECE Japan, Vol. 64-B, No. 10, 1981, GMSK Modulation System Transmission Characteristic by Kazuaki Murota and Kenkichi Hiraide).

As discussed above, when PSK-modulated signal is demodulated according to the above-described delay detection system, the signal received is divided into two parts, one of which is merely delayed. Therefore, the circuitry can be considerably simplified. However, in the case where the PSK modulation is applied to the transmission of a digital signal in a high frequency band, a difficulty is involved in that the demodulation reliability is rather low.

This will be described in more detail. In the delay detection system, the operating reference point is:

$$\Delta\theta = \Omega T/2$$

Therefore, as the carrier angular frequency changes as much as $\Delta\Omega$ by a temperature variation, the operating reference point is shifted as much as $\Delta\Omega T/2$. If this change is great, then it is impossible to determine the "mark" and "space" periods according to whether or not the output level of the phase comparator exceeds $V_0/2$. For instance when the carrier frequency is 2.5 GHz, and the temperature variation coefficient of the oscillator (which is a SAW oscillator in this case) is a $\pm 3 \times 10^{-4}$, then the frequency variation is $\pm 750$ KHz. If, in this case, the data transmission speed is set to 32 K bps, then $T = 1/32$ msec, and $\Delta\Omega T/2 = 23.44 \pi$; that is, the change of the operating reference point is about 23.44 $\pi$. In practice, the operating reference point is further shifted, being affected not only by temperature variation, but also by noise and interference waves by multipath. Therefore, it is often difficult or impossible to determine the "mark" and "space" periods through comparison of the input level of the phase comparator with a predetermined reference level.

The synchronous detection system is based on the reproduction of the carrier frequency utilizing a COSTAS loop. The synchronous detection system, unlike the phase detection system, is free from the difficulties attributed to frequency variation, and can therefore demodulate the signal with high accuracy.

However, the synchronous detection system still suffers from the following problems: Provision of a signal having a frequency equal to the carrier frequency of a signal received requires a local oscillator, namely, a voltage-controlled oscillator, and a phase synchronization loop, which not only makes the circuitry intricate, but also increases the manufacturing cost. This difficulty is serious for a radio device installed on a vehicle, because emphasis is placed on miniaturization, simplification and cost reduction of the radio device.

In an effort to improve reliability of data detection using a delay detection device, applicants proposed in Japanese Application No. 165014/86, filed July 14, 1986 (corresponding to U.S. Ser. No. 072,162, entitled "PSK Modem System Having Improved Demodulation Reliability", filed July 10, 1987, the disclosure of which is incorporated herein by reference in its entirety), a modem system in which a phase reference part having a predetermined period of time in total is provided at the front and/or rear of a time slot of the digital pulse signal and the phaes of the pulse sigal is changed to a predetermined value according to a predetermined monotone function in the first half of the remaining period of time of the time slot, and then changed later in the time slot in the opposite direction to a reference value, with the phase change in the first half of the remaining period time being effected in a first, e.g., increasing, direction in correspondence to a "mark" state of the signal and in a second opposite, e.g., decreasing, direction in correspondence to a "space" state, and the signal thus transmitted is received and divided into two parts and one of the two parts is compared in phase with the other after being delayed, to obtain the original digital pulse signal.

In the just-described system, the reference phase part is so determined as to occupy a half (½) or quarter (1/4) of one time slot of the digital pulse signal to perform the delay detection. However, in such a modem system, as the carrier frequency variation $\Delta\Omega$ increases, the variation $\Delta\Omega \times T/2$ or $\Delta\Omega \times T/4$ of the referece operating point of the phase comparator increases so greatly that the stability of the delay detection is not considerably improved. Therefore, the carrier frequency should be so determined that the stability is not adversely affected by the variation $\Delta\Omega$.

Figure 17:
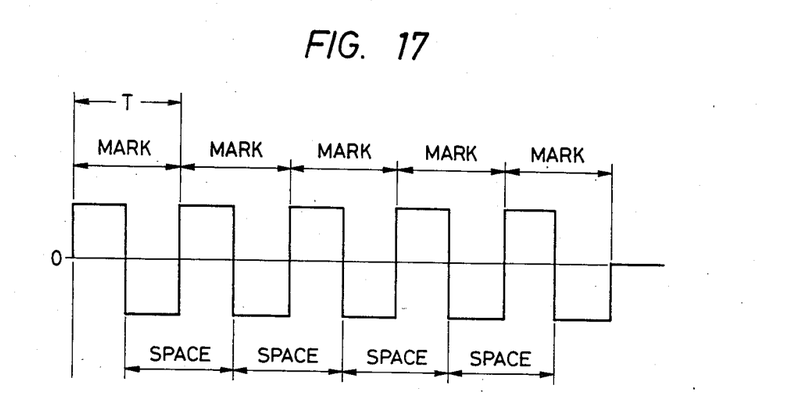
FIG. 17 is a waveform diagram showing a demodulated signal in which the phase change of "mark" periods is opposite to that of "space" periods.

Also, in the demodulated signal obtained in the modem system described in Japanese Patent Application No. 165014/86, the positive phase part is shifted by ½ time slot from the negative phase part. Therefore, for instance, in the case where, as shown in FIG. 17, "mark" signals occur successively, they may be mistaken for a succession of "space" signals if the timing is shifted only a ½ time slot. Where, in contrast, "space" signals occur successively, they may be mistaken for a succession of "mark" signals.

This difficulty may be overcome by transmitting a predetermined signal train on the transmitting side, and detecting the signal train on the receiving side to determine the timing, so that the demodulated signal is accurately identified. However, the method is not suitable for high-speed communication, because it is necessary to transmit the signal required for the determination of the timing in addition to the data which are originally to be transmitted, with the result that the data transmission density is decreased. Furthermore, on the signal receiving side, it is necessary to provide a processing time for determination of the timing. Also, the same signal must be trasmitted several times as the case may be, which further increases the data transmission time.

OBJECTS AND SUMMARY OF THE INVENTION

In view of the foregoing, one object of this invention is to provide a modem system in which a PSK-modulated signal can be readily and accurately demodulated using a delay detection system.

Another object of this invention is to provide a modem system in which a PSK-modulated signal can be readily and accurately demodulated using a delay detection system, and the data transmission density can be increased while the data transmission time can be decreased.

The first object of the invention can be achieved by the provision of a modem system in which, in a first aspect of the invention, a digital pulse signal is transmitted which is phase-modulated in such a manner that reference phase parts having a predetermined time in total are provided in the front and/or rear part of a time slot of the digital pulse signal, and in the first half of the remaining period of the time slot the phase thereof is changed stepwise in a predetermined direction from a reference value in correspondence to the "mark" state of a transmission signal, while in the second half of the remaining period the phase thereof it is changed stepwise in a direction opposite to the predetermined direction to the reference value, and in correspondence to the "space" state of the transmission signal the phase thereof is changed in a direction opposite to that in the case of the "mark" state of the signal, and the signal thus transmitted is divided into two parts when received, and one of the two parts is delayed ad compared, in phase, with the other, to obtain the original digital signal.

The modem system may be such that the signal which is transmitted is phase-modulated in such a manner that the remaining part of the time slot is divided into a plurality of intervals, and the phase thereof is changed stepwise in a predetermined direction to a predetermined value in the front intervals and changed stepwise in a direction opposite to the predetermined direction to a reference value in the rear intervals and the phase change in the front intervals is set a predetermined direction in correspondence to the "mark" state of the signal, and in a direction opposite to that for the "mark" state in correspondence to the "space" state of the signal.

Furthermore, the modem system is such that, on the signal demodulation side, the signal received is divided into two parts, one of which is phase-compared with the other after being delayed as long as the total time of the reference phase parts. The amount of delay may be controlled by a synchronizing clock signal obtained from an NRZ signal formed through demodulation. The NRZ signal is obtained by removing DC components from the phase comparator output and is formed with the aid of a flip-flop which receives the output of the phase comparator and, as a clock signal, a signal obtained by delaying the synchronizing signal for a predetermined period of time.

In the present invention, in contrast with the system described in Japanese Application No. 165014/86, even when the time width of the reference phase parts is set to other than T/2 and T/4, the delay detection can be carried out only with the amplitude, without being affected by the width of the signal which is obtained from the difference between the received signal and the delayed signal. Therefore, in the case where the variation $\Delta\Omega$ is large, by decreasing the time width of the reference phase parts, the variation of the reference operating point can be maintained in the predetermined range, and the delay detection can be achieved with high stability.

The second object of the invention is achieved by a modem system according to a second aspect of the invention, in which a phase modulation is carried out in such a manner that, in correspondence to one of the "mark" and "space" states of a transmission signal, reference phase parts having a predetermined period of time in total are provided in the front and/or rear part of a time slot of a digital pulse signal, and in the front half of the remaining part of the time slot the phase thereof is changed in a predetermined direction while in the rear half the phase is changed in the opposite direction to a reference phase, and, in correspondence to the other state of the transmission signal, only the reference part is formed over the entire time slot of the digital pulse signal.

In the modem system according to a third aspect of the invention, a signal is transmitted which is phase-modulated in such a manner that, in correspondence to one of the "mark" and "space" states of a transmission signal, reference phase parts having a predetermined period of time in total are provided in the front and/or rear part of a time slot of a digital pulse signal, and in the front half of the remaining part of the time slot the phase thereof is changed in a predetermined direction while in the rear half the phase is changed in the opposite direction a reference phase, and in correspondence to the other state of the transmission signal, only the reference phase part is formed over the entire time slot of the digital pulse signal, and the signal thus transmitted is divided into two parts when received, so that one of the two parts is delayed and compared, in phase, with the other, to provide an output signal, which is subjected to full-wave rectification to obtain an NRZ signal.

The above and other objects advantages and features of the invention will become more readily apparent from the following detailed description which is provided in connection with the accompanying drawings.

DETAILED DESCRIPTION OF THE INVENTION

Preferred embodiments of this invention will be described with reference to the accompaying drawings.

Figure 1A:
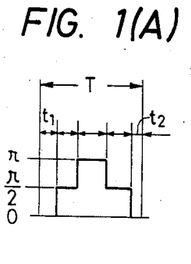
FIGS. 1(A), 1(B), 1(C) and 1(D) are diagrams for a description of one example of a modulation system in accordance with a first embodiment of the invention.
Figure 1B:
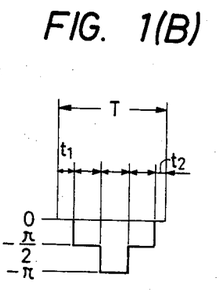

FIG. 1 is a diagram for a description of one example of a modulation system according to this invention. In each of FIGS. 1(A) and 1(B), phase parts having period of time $t_1$ and $t_2$ are provided before and after a phase variation part, respectively. The periods of time $t_1$ and $t_2$ are so determined as to meet the following equation:

$$t_1 + t_2 = \Delta T$$

where $\Delta T$ is a predetermined period of time shorter that one time slot T of a digital signal. In the remaining period of the time slot, in the case of a "mark", as shown in FIG. 1(A) the phase is changed to a predetermined value $\theta$ in the initial period and to the value zero (0) in the final period; and in the case of a "space", as shown in FIG. 1(B) the phase is changed to $-\theta$ and 0, respectively.

Figure 1C:
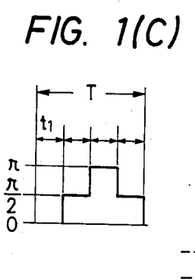
Figure 1D:
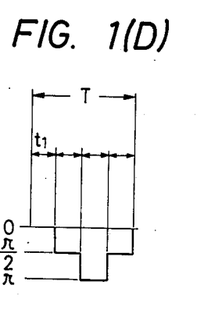

FIGS. 1(C) and 1(D) show the case where the periods of time $t_1$ and $t_2$ are so determined as to satisfy $t_1 = \Delta T$, and $t_2 = 0$. The phase changes in the remaining period of the time slot are the same as those in FIGS. 1(A) and 1(B).

It should be noted that the signal characteristics of FIGS. 1(A) and 1(B) are equal to those of FIGS. 1(C) and 1(D). That is, as long as the condition $t_1 + t_2 = \Delta T$ is satisfied, the characteristic is maintained unchanged. Therefore, to simplify further description, only the signal patterns of FIGS. 1(C) and 1(D) will be described, with a delay time TR set to $\Delta T$.

Figure 2A:
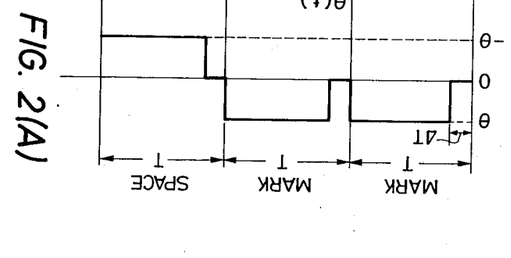
FIGS. 2(A), 2(B), 2(C), 2(D), 2(E), 2(F), 2(G) and 2(H) are diagrams for a description of one example of a demodulation system in accordance with the first embodiment of the invention.
Figure 2B:
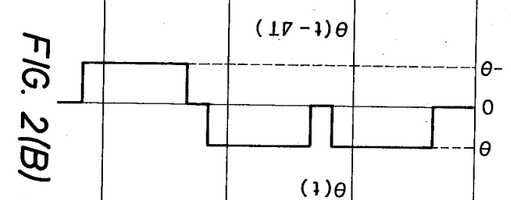

FIGS. 2(A)...2(H) are diagrams for a description of the delay demodulation used to demodulate the above-described modulated signal, showning a signal supplied in the order of "mark", "mark" and "space". A signal $\theta(t)$ of "mark-mark-space" as shown in FIG. 2(A) is applied to one of the input terminals of a phase comparator, whereas a signal $\theta(t-\Delta T)$ which lags the signal $\theta(t)$ by a predetermined time $\Delta T$ as shown in the FIG. 2(B) is supplied to the other input terminal of the phase comparator.

Figure 2C:
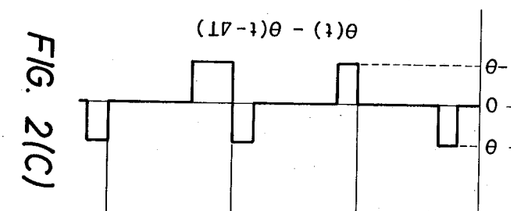
Figure 2D:
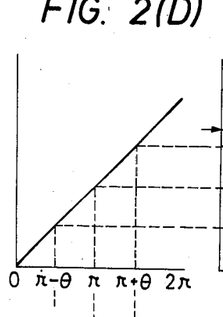
Figure 2E:
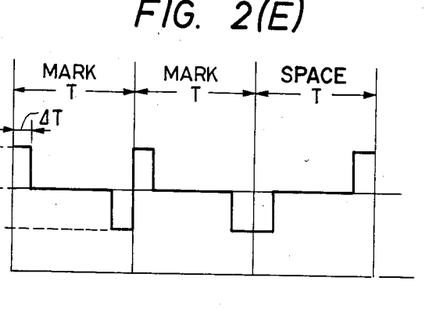

Accordingly, the difference $\theta(t) - \theta(t - \Delta T)$ between the two signals, as shown in FIG. 2(C) is $-\theta$ for the first period $\Delta T$ in a time slot corresponding to a "mark" period and $\theta$ for the next period $\Delta T$; and in a time slot corresponding to a "space" period, the difference is $\theta$ for the first period $\Delta T$ and $-\theta$ for the next period $\Delta T$ (however, it should be noted that, when a "mark" period is switched over to a "space" period or vice versa, the value for the first period $\Delta T$ in the time slot is inverted). And, as shown in FIG. 2(E), the output level is set to $V_1$ for the initial period $\Delta T$ in a time slot correspoding to a "mark" period and to $V_2$ for the final period $\Delta T$ according to the characteristic curve of the phase comparator, and in a time slot correspoding to a "space" period the output level is set to $V_2$ for the initial period $\Delta T$ and to $V_1$ for the final period $\Delta T$. Both for the "mark" period and for the "space" period, the average value of the output level of the phase comparator is $(V_1 + V_2)/2$.

Figures 2F, 2G, 2H:
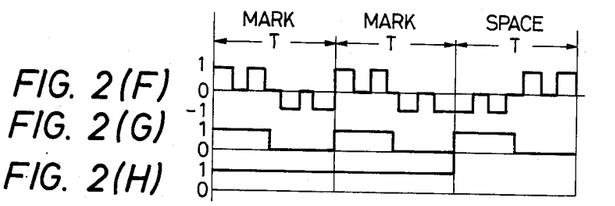

Accordingly, if a DC component is removed from the output signal of FIG. 2(E), as shown in the signal of FIG. 2(F), an NRZ signal of FIG. 2(H) can be formed due to the fact that the level is zero or changes from negative to positive at the beginning of a time slot in the case of a "mark" period, and it is zero or changes from positive to negative at the beginning of a time slot in the case of a "space" period, and the original digital data can be obtained.

The difficulty accompanying the conventional system that the phase comparison reference point, i.e., the reference level of the phase comparator output is changed by the carrier frequency variation, which makes it difficult to determine whether the signal is a "mark" signal or a "space" signal can be completely eliminated.

That is, the average value of a train of outputsignals provided by the phase comparator is constant independently of the arrangement of the train of output signals (for instance "mark", "mark" and "mark", or "mark", "space" and "mark"). Therefore, if a capacitor or the like is used to remove the DC component from the output waveform, then irrespective of the variation of the reference point the stable waveform of FIG. 2(F), in which the positive amplitude and the negative amplitude are equal to each other, can be obtained, accordingly, the "mark" and the "space" can be positively determined irrespective of the variation of the reference point.

Figure 3:
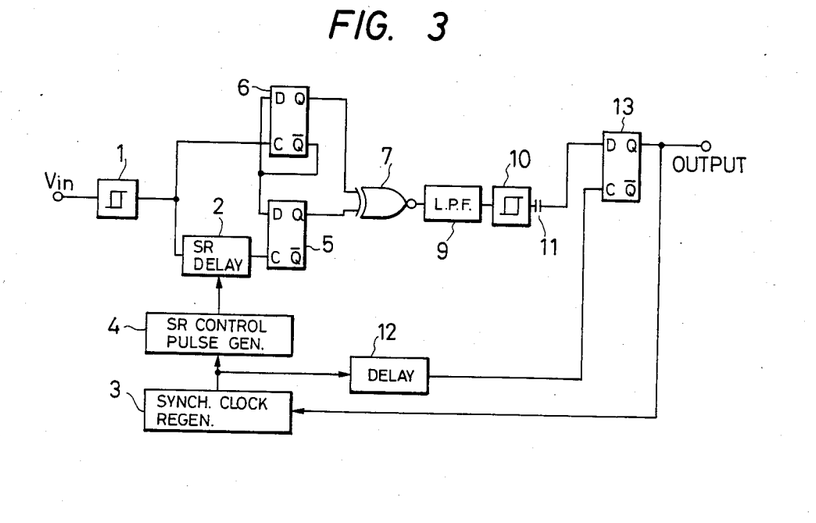
FIG. 3 is an electrical circuit diagram showing one example of a demodulation circuit.

FIG. 3 is an electrical circuit diagram showing one example of a demodulation circuit. In the circuit, an input signal $V_{in}$ is supplied to a Schmitt trigger circuit 1, the output signal of which is applied to an SR (shift register) delay circuit 2. The SR delay circuit 2 receives a pulse signal from an SR control pulse generating circuit 4 to set a delay time. The SR control pulse generating circuit 4 is controlled by a synchronizing clock signal outputted by a synchronizing clock reproducing cicuit 3 which receives the formed NRZ signal.

The output signal of the SR delay circuit 2 is applied to the clock input terminal of a D flip-flop 5. The output signal of the Schmitt trigger circuit 1 is further applied to the clock input terminal of a D flip-flop 6. The $\overline{Q}$ output signal of the D flip-flop 6 is applied to the D input terminals of the two D flip-flops 5 and 6. The Q output signals of the D flip-flops 5 and 6 are applied to an X(EXCLUSIVE)NOR gate, to obtain a phrase comparison result.

The output signal of the XNOR gate 7 is supplied through a low-pass filter 9 and a Schmitt trigger circuit 10 to a capacitor 11, so that a DC component is removed therefrom and the signal as shownin FIG. 2(F) is obtained. A synchronizing clock signal produced by the synchronizing clock reproducing circuit 3 is supplied to the D input termial of a D flip-flop 13, to the clock input terminal of which the signal delayed by a predetermined period of time by a delay circuit 12 is applied, as a result of which the NRZ signal, as shown in FIG. 2(H), is obtained.

Figure 5C:
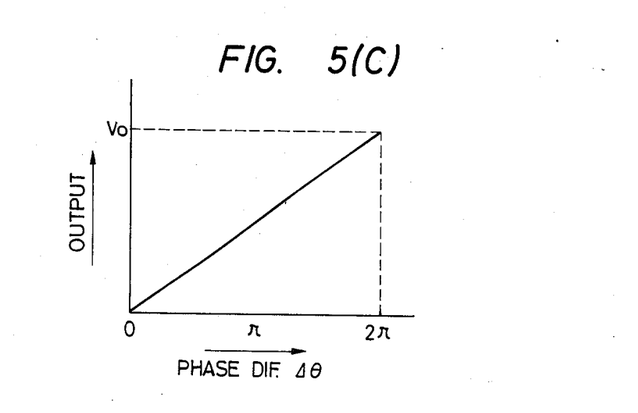

As is apparent from the above description, the above-described demodulation circuit is formed merely by adding the capacitor 11, the D flip-flop 13 and the delay circuit 12 to the conventional delay detection circuit, (FIG. 5(A), 5(B) and 5(C)). Consequently, it is simple in circuitry, and is advantageous in that the signal demodulation can be achieved accurately without being affected by the variation of the carrier frequency or the like.

Since the delay time $\Delta T$ can be set to an extremely small value (i.e., when there is a period when the signal shown in FIG. 2(F) is at the "1" level of "0" level, the level can be detected even if the period is short), the reference operating point of the phase comparator can be decreased to $\Delta\Omega\Delta T$ (where $\Delta\Omega$ is the variation of a carrier frequency), with the result that the stability is much improved. That is, as was described above, if, in the case where the reference point variation is $\pm 23.44$ $\pi$ in the conventional system, the delay time $\Delta T$ is set to $1/(32\times 200)$ m sec for instance, then the reference point variation can be decreased to $\pm 0.2344$ $\pi$ which is acceptable for the delay detection system. In the case where $\Delta T$ is reduced to an extremely small value as was described above, the output of the phase detecting section is considerably small in the range of variation. However, in the above-described embodiment, the phase is changed stepwise and the variation itself is not changed, and therefore the phase change can be satisfactorily detected. When the delay time $\Delta T$ is set as described above, the maximum frequency handled by the signal system is 6.4 MHz. This frequency is within the range of frequencies which can be satisfactorily processed by contemporary digital techniques.

Furthermore, in the above-described embodiment, the reference phase part is provided before and/or after the phase variation part, and therefore interference between the signals in each time slot can be prevented.

FIG. 4 is a diagram for a description of another embodiment of the invention. This embodiment is different from the above-described embodiment only in that the phase variation part in a "mark" period changes in the order of 0, $\theta$, $2\theta$, $\theta$ and 0 as shown in FIG. 4(A), and the phase variation part in a "space" period changes in the order of 0, $-\theta$, $-2\theta$, $-\theta$ and 0.

Figure 4A:
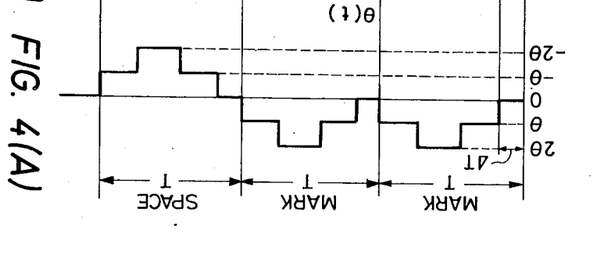
FIGS. 4(A), 4(B), 4(C), 4(D) and 4(E) are diagrams for a description of another example of the demodulation system.
Figure 4B:
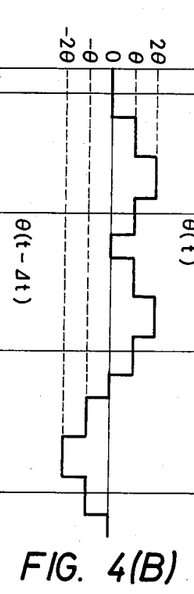

Therefore, if the signal shown in FIG. 4(A) is represented by $\theta(t)$, then the signal $\theta(t-\Delta T)$ is as indicated in FIG. 4(B). The difference $\theta(t)-(t-\Delta T)$ between the two signals, as shown in FIG. 4(C), is $-\theta$ for the initial period $\Delta T$ in a time slot corresponding to a "mark" period, $\theta$ for the next period $\Delta T$, $\theta$ a predetermined period thereafter, and $-\theta$ a predetermined period thereafter; and in a time slot corresponding to "space" period, for the initial period $\Delta T$, $-\theta$ for the next period $\Delta T$, $-\theta$ a predetermined period thereafter, and $\theta$ a predetermined period thereafter (when "mark" is switched over to "space" or vice versa, the value for the initial period $\Delta T$ of the time slot is inverted in sign).

Figure 4C:
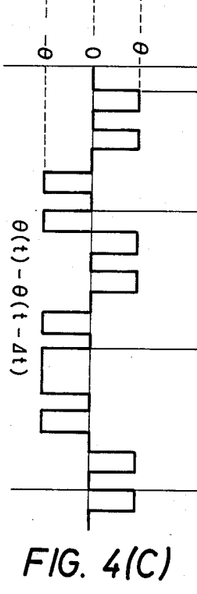
Figure 4D:
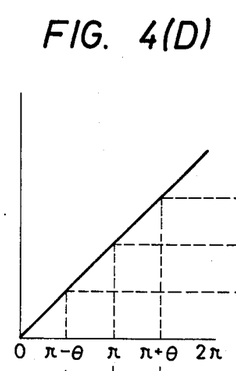
Figure 4E:
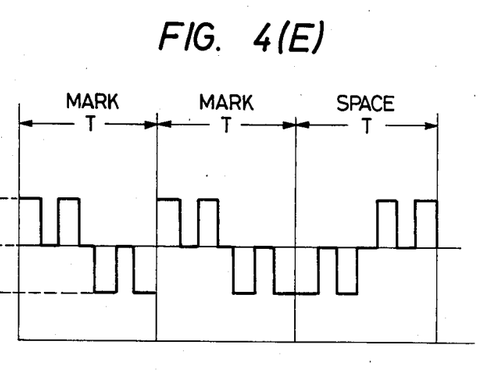

The phase difference as shown in FIG. 4(C) is applied to a phase comparator having a characteristic as shown in FIG. 4(D), so that an output waveform as indicated in FIG. 4(E) is obtained. That is, in the demodulation circuit of FIG. 3, the NRZ signal corresponding to the original digital data can be obtained by setting the delay time of the SR delay circuit 2 to $\Delta T$.

In the above-described embodiment, as the time $\Delta T$ is decreased, the amount of shift $\Delta\Omega\Delta T$ attributed to the carrier frequency variation of the phase reference point is decreased and the time width of the outputsignal of the phase comparator is decreased; however, the variation of the output signal is not changed. Therefore, the demodulation can be achieved with high accuracy.

That is, in any one of the above-described embodiments, the time $\Delta T$ can be set to a desired value. Therefore, even when the carrier varies greatly in frequency, delay detection can be positively carried out, and the system has increased design freedom and is economical to produce.

As described above, in the modem system of the first aspect of the present invention, a digital pulse signal is transmitted which is phase-modulated in such a manner that a reference phase part having a predetermined period of time in total is provided in the front and/or rear part of a time slot of a digital pulse signal, and at least in the front half of the remaining time slot, the phase is shifted stepwise in a predetermined direction in correspondence to the "mark" state of the signal and in the opposite direction in correspondence to the "space" state. Therefore, according to the delay detection system in which the signal is delayed as long as the time of the referece phase part, the original digital signal can be obtained without being affected by the carrier frequency variation.

In addition, the modem system of the first aspect of the invention provides a transmission signal which is PSK-modulated in such a manner that a phase reference part of a predetermined time is provided in the front and/or rear part of a time slot of a digital pulse signal, and the phase is changed from a reference value to a first or second predetermined value for a "mark" or "space" respectively according to a monotone function in the first half of the remaining period of time of the time slot and changed in the opposite direction to the reference value in the second half of the remaining period. Therefore, the modem system of the invention can obtain the original digital signal readily and accurately by means of a delay detection system, in which the signal is delayed as long as the time of the phase reference part, without being affected by any variations in the carrier frequency.

Thus far, description has been made of the modulation signals and the demodulation circuit for demodulating those signals. The modulation circuits themselves, are simple and straightforward. A suitable modulation system for generating the modulated signals shown in FIG. 2A will now be described in connection with FIGS. 9 to 11.

Figure 9:
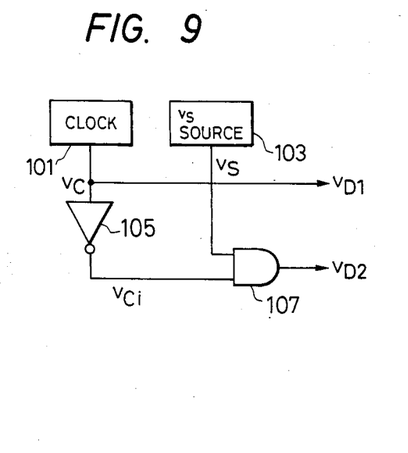
FIG. 9 is a diagram of a modulation circuit for generating the signal pattern shown in FIG. 2A.
Figure 10:
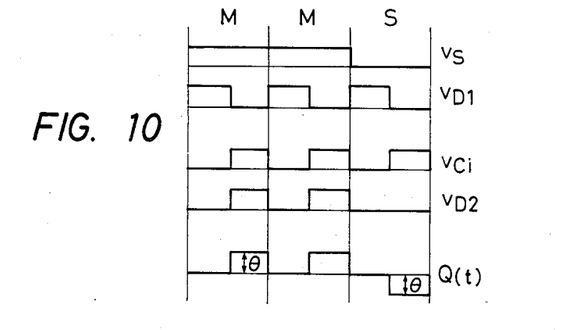
FIG. 10 is a timing diagram showing operation of the FIG. 9 circuit.
Figure 11:
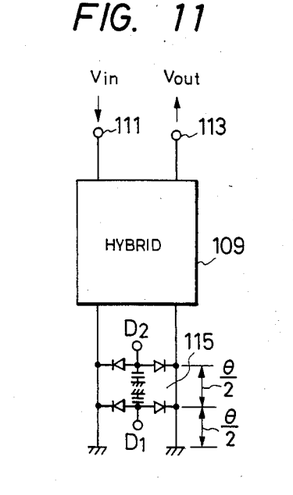
FIG. 11 is a hybrid circuit for generating a modulation signal in accordance with one of the embodiments of the invention.

FIG. 9 illustrates a modulation circuit in which a clocking signal source 101 and a data signal source 103 are provided. These sources respectively produce timing pulses $V_c$ and data pulses $V_s$. The timing pulse $V_c$ is supplied as an output switching signal $V_{D1}$ and is also applied to inverter 105 to produce a signal $V_{ci}$ which is applied as one input to an AND gate 107. The other input to AND gate is the data signal $V_s$. The output of the AND gate 107 is a second switching signal $V_{D2}$. The relationship of the switching signals produced by the modulation circuit shown in FIG. 9 is illustrated in FIG. 10. As shown therein, the data signal produces a "mark"—"mark"—"space"—signal pattern. The corresponding switching signals $V_{D1}$ and $V_{D2}$ generated by the modulation circuit of FIG. 9 is also illustrated. The switching signals are applied to a hybrid circuit 109 illustrated in FIG. 11. A carrier is applied to the input terminal 111 and the output of the hybrid circuit it taken at terminal 113. The phase of the signal applied to the input terminal $V_{in}$ is changed in accordance with the switching signals $V_{D1}$ and $V_{D2}$ which are applied to a diode network 115. As shown in FIG. 13, when both switching signals $V_{D1}$ and $V_{D2}$ are in a low state, the diode network 115 causes the hybrid circuit 109 to produce a negative phase shift for the signal applied at the terminal $V_{in}$ to the hybrid circit 109. When $V_{D1}$ is high and $V_{D2}$ is low, a reference phase part is established meaning that no phase shift occurs in hybrid circuit 109. When $V_{D2}$ is high and $V_{D1}$ is low, a positive phase shift is generated. As shown in the signal diagram $\theta(t)$ of FIG. 10 the resultant output from the hybrid circuit is a phase shift in a positive direction for a "mark" signal and a phase shift in a negative direction for a "space" signal.

A detailed description will now be provided of other embodiments of the invention.

FIGS. 12(A), 12(B), 12(C) and 12(D) are diagrams showing examples of a modulation system according to another embodiment directed to a second aspect of the invention.

Figures 12A, 12B, 12C, 12D:
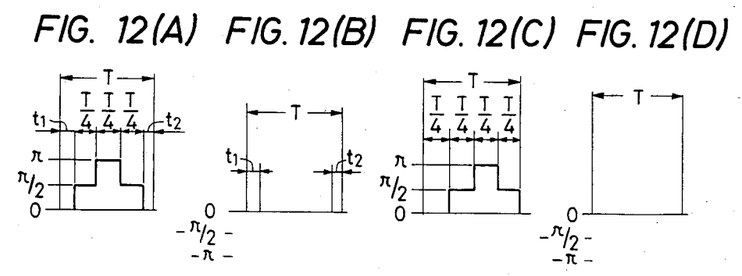
FIGS. 12(A), 12(B), 12(C) and 12(D) are diagrams for a description of a modulation system according to another embodiment of this invention.

In FIGS. 12(A) and 12(B), reference phase parts having periods of time $t_1$ and $t_2$ are provided before and after a phase variation part of a modulation signal, respectively. The periods of time $t_1$ and $t_2$ are so determined as to meet the following equation:

$$t_1 + t_2 = \Delta T$$

where $\Delta T$ is the predetermined period of time shorter than one time slot of a digital signal. In the remaining part of the time slot, the phase is changed as follows: In the case of the "mark" state of the signal, as shown in FIG. 12(A), the phase is changed to a predetermined value $\theta$ at the beginning of the period and to zero at the end of the period; and in the case of the "space" state, as shown in FIG. 12(B), the phase is maintained at zero (i.e., the phase is not changed at all).

FIGS. 12(C) and 12(D) show the case where the periods of time $t_1$ and $t_2$ are set to $\Delta T$ and 0, respectively. The phase change in the remaining part is the same as in the case of Figs. 12(A) and 12(B).

It should be noted that the signal characteristic of signals of FIGS. 12(A) and 12(B) are equal to those of the Figs. 12(C) and 12(D) signals. That is, the characteristic is maintained unchanged as long as the condition $t_1 + t_2 = \Delta T$ is satisfied, as described later. Therefore, to simplify description only the signals of FIGS. 12(C) and 12(D) will be described, with a delay time TR set to $\Delta T$.

FIG. 12(C) shows a "mark" signal, and the phase $\theta(t)$ is $\theta_0$ with $0 \leq t < \Delta T$, $\theta_0 + g(t - \Delta T)$ with $\Delta T \leq t < \Delta T + T'/2$, and $\theta_0 + g(T - t)$ with $\Delta T + T'/2 \leq t < T$.

FIG. 12(D) shows a "space" signal, and the phase $\theta(t)$ is $\theta_0$ with $0 \leq t < T$.

The function $g(t)$ is the phase variation function, and includes not only a phase which changes continuously, but also a phase which changes stepwise. Furthermore, $T'/2$ is a half of the period of time of the remaining part of the time slot which is other than the reference phase part.

FIG. 13(A), 13(B), 13(C), 13(D) and 13(E) are diagrams for a description of the demodulation of the above-described modulated signal. In this case, the signal is supplied in the order of "mark", "mark" and "space".

Figure 13A:
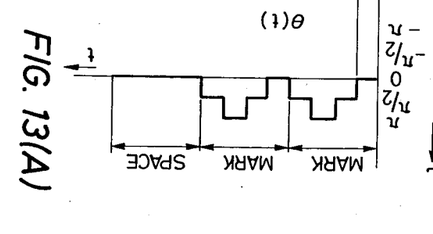
FIGS. 13(A), 13(B), 13(C), 13(D), 13(E), 13(F), and 13(G) are diagrams for a description of a demodulation system which may be used in accordance with the FIG. 12 embodiment.
Figure 13B:
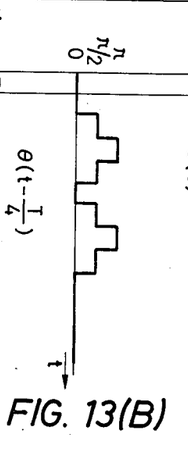
Figure 13C:
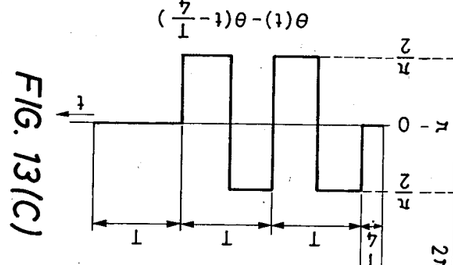

A signal $\theta(t)$ corresponding to "mark", "mark" and "space" as shown in FIG. 13(A) is applied to one input terminal of a phase comparator, and a signal $\theta(t - \Delta T)$ which lags the signal $\theta(t)$ by a predetermined period of time $\Delta T$ is applied to the other input terminal of the phase comparator.

Accordingly the difference $\theta(t) - \theta(t - \Delta T)$ between the two signals is $\theta$ for the first period $\Delta T$ of the time slot corresponding to the "mark" state, and $-\theta$ for the next period $\Delta T$, and zero (0) for the entire time slot corresponding to the "space" state.

Figure 13D:
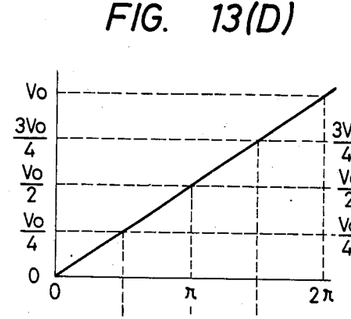
Figure 13E:
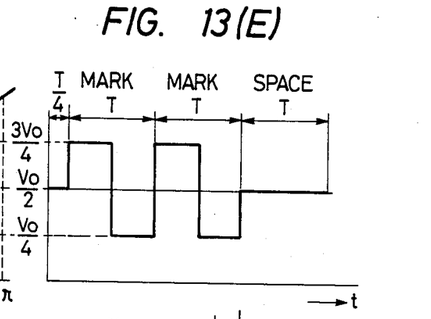

As shown in FIG. 13(E), according to the characteristic of the phase comparator shown in FIG. 13(D), the output level is set to $V_1$ for the first period $\Delta T$ in the time slot corresponding to the "mark" state and to $V_2$ for the last period $\Delta T$, and to $V_3$ for the entire time slot corresponding to the "space" state.

Figure 13F:
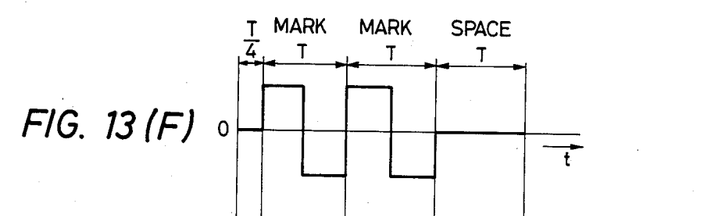
Figure 13G:
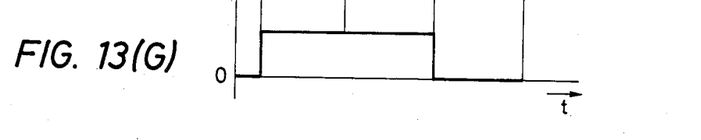

Accordingly, when a DC component is eliminated from the output signal shown in FIG. 13(E), as shown in FIG. 13(F), and an NRZ signal (FIG. 13(G)) can be formed according to the fact that, in a time slot, the level is changed from positive to negative for the "mark" state and is maintained at zero for the "space" state, the original digital data can be obtained.

Figure 15:
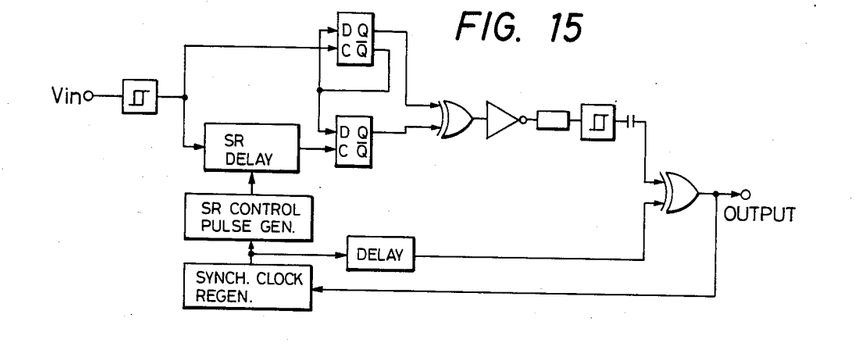
FIG. 15 and 16 are electrical circuit diagrams showing other examples of the demodulation circuit.
Figure 16:
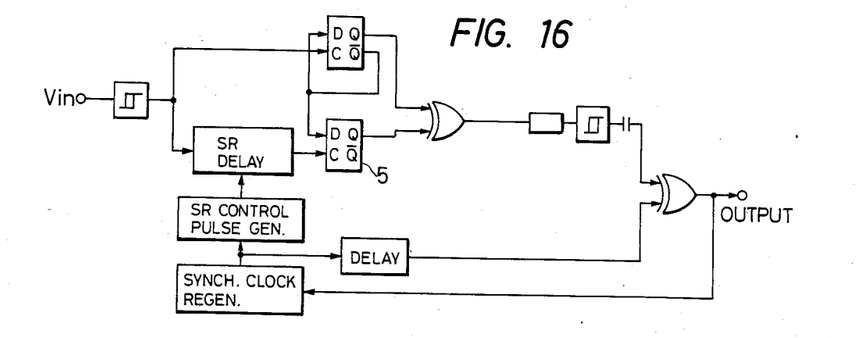

The above-described delay demodulation can be readily achieved with the demodulation circuit shown in FIG. 3, or with one of the demodulation circuits shown in FIGS. 15 and 16.

Figure 14:
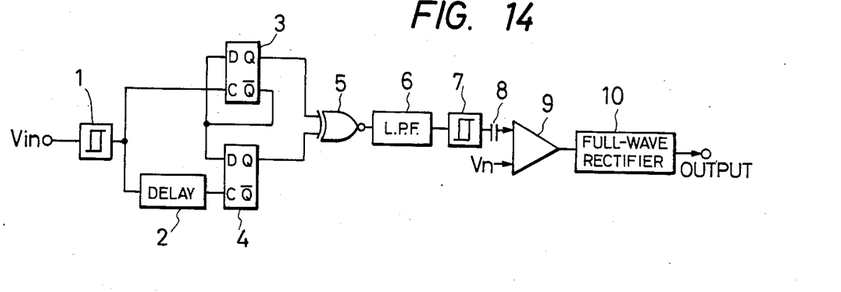
FIG. 14 is an electrical circuit diagram showing one example of a demodulation circuit.

FIG. 14 is an electrical circuit diagram showing one example of a demodulation circuit according to a second aspect of the invention. In the circuit, an input signal $V_{in}$ is applied to a Schmitt trigger circuit 1, the outputsignal of which is applied to a delay circuit 2 having a delay time $\Delta T$.

The output signal of the Schmitt trigger circuit 1 is further applied to the clock input terminal of D-type flip-flop 3. The output signal of the delay circuit 2 is supplied to the clock input terminal of a D-type flip-flop 4. The $\overline{Q}$ output signal of the D flip-flop 3 is applied to the D input terminals of the flip-flops 3 and 4. The Q output signals of the D flip-flops 3 and 4 are supplied to an XNOR (EXCLUSIVE NOR) gate 5 for phase comparison.

The output signal of the XNOR gate 5 is supplied through a low-pass filter 6 and a Schmitt trigger circuit 7 to a capacitor 8, so that a DC component is eliminated from the output signal. The output signal of the capacitor 8 is applied to a comparator 9, where it is compared with a reference voltage $V_n$. The output signal of the comparator 9 is subjected to full-wave rectification, so that the NRZ signal as shown in FIG. 13(G) is obtained.

As is apparent from the above description, in the embodiment of FIG. 14, the signal is transmitted which is modulated in such a manner that the phase is changed in correspondence to the "mark" signal and is not changed at all in correspondence to the "space" signal, and the signal thus transmitted is divided into two parts when received, to perform the delay detection. Therefore, in the digital transmission according to the invention, even if the timing is somewhat shifted, there will be no possibility that the "mark" and "space" signals are mistaken for each other.

It is unnecessary for the embodiment of FIG. 14 to use a synchronizing clock reproducing circuit, a stabilizing circuit, and an NRZ demodulation section. Therefore, the system can be considerably simplified ad miniaturized; that is, it is advantageous in that it can be readily installed on a vehicle.

In the just described embodiment of the invention, the signal whose phase is not changed at all is transmitted for the "space" signal; however, instead, that signal may be transmitted for the "mark" signal. Furthermore, the NRZ signal can be obtained by using a D flip-flop instead of the full-wave rectifier circuit, or by using an XNOR gate. That is, it will be obvious to those skilled in the art that various changes and modifications may be made therein without departing from the invention.

As was described above, according to the second aspect of the invention, the phase modulation is carried out in such a manner that, in correspondence to one of the "mark" and "space" state of the transmission signal, the reference phase parts having the predetermined period of time in total are provided in the front and/or rear part of the digital pulse signal, and at least in the front half of the remaining part of the time slot the phase is changed in the predetermined direction in correspondence to the "mark" state of the transmission signal, and in correspondence to the "space" state the phase is not changed at all. Therefore, the difficulty that the digital data are mistaken in identification after demodulation can be positively prevented.

Furthermore, according to another aspect of the invention, a signal is transmitted which is phase-modulated in such a manner tha in correspondence to one of the "mark" and "space" states of the transmission signal, reference phase parts having a predetermined period of time in total are provided in the front and/or rear part of a time slot of the digital pulse signal, and at least in the front half of the remaining part of the time slot the phase is changed in the predetermined direction in correspondence to the "mark" state of the trasmission signal, and in correspondence to the other state the phase is not changed at all; and the signal thus transmitted is divided into two parts for delay detection when received. Therefore, irrespective of the timing, the "mark" and "space" signals can be accurately detected according to whether or not the phase changes in a time slot of the signal, and the data transmission density can be increased while the data transmission time can be decreased. Furthermore, since a synchronizing clock reproducing circuit, a stabilizing circuit, and an NRZ demodulation section can be eliminated, the system is simple in arrangement and small in size.

Figure 18:
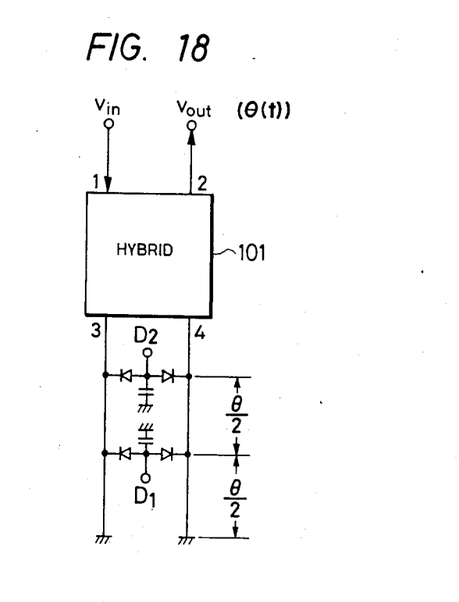
FIG. 18 is a hybrid circuit for generating a modulation signal in accordance with one of the embodiments of the invention.
Figure 19:
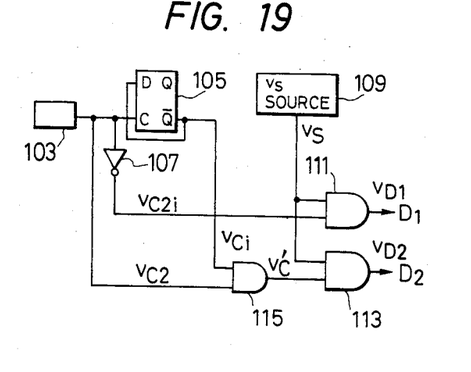
FIG. 19 is a control circuit for the hybrid circuit of FIG. 18.
Figure 20:
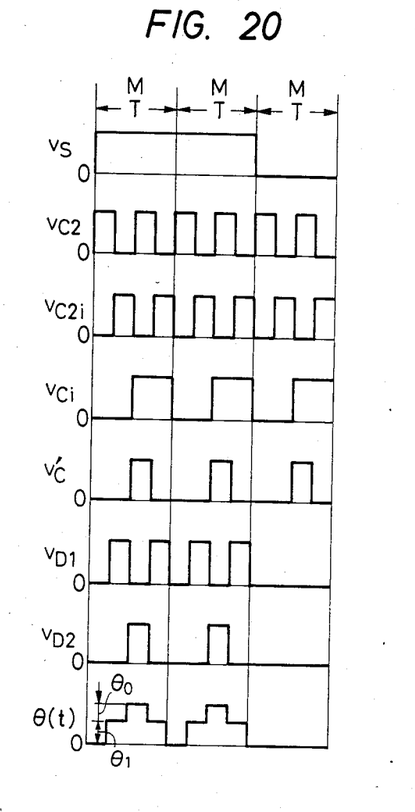
FIG. 20 are timing diagrams for explaining the operation of FIG. 18.

FIGS. 18 and 19 depict circuits suitable for generating the modulation signal patterns of FIGS. 12(C) and 12(D) and 13(A), while FIG. 20 depicts the timing diagrams for signals at various points in FIG. 19. A hybrid circuit 101 is used to shift the phase of an incoming signal $V_{in}$ depending on the states of applied control signals $D_1$ and $D_2$ which are generated by the circuit of FIG. 19. A clock source 103 supplies clock pulses $V_{c2}$ and inverter 107 also supplies inverted clock pulses $V_{c2}$. The clock pulses $V_{c2}$ trigger flip-flop 105 to produce output pulses $V_{ci}$ which are applied to AND gate 115 together with clock pulses $V_{c2}$. The output of AND gate 115 is supplied together with data $V_s$ source 109 to AND gate 113. The inverted clock pulses $V_{c2i}$ and data signals $V_{3s}$ are also supplied to AND gate 111. The output of AND gate 111 supplies the signal $D_1$, while the output of AND gate 113 supplies the signal $D_2$. The relationships of the various signals and the resultant modulated signal (t) are all shown in FIG. 20.

While several preferred embodiments of the invention in different aspects have been described and illustrated, it is apparent that many modifications can be made without departing from the spirit or scope of the invention. Accordingly, the invention is not limited by the foregoing description, but is only limited by the scope of the appended claims.

I claim:

1. A modem system for digital data, comprising:
means for producing a transmission signal which is phase modulated in accordance with "mark" and "space" states of an applied digital signal in repetitive signal time slots, each of a predetermined duration, said transmission signal having a phase reference period of predetermined time duration in total provided at at least one of the front and rear portions of each of said time slots during which said transmission signal assumes a reference phase value, and in the first half of the remaining portion of each said time slot the phase of said transmission signal changes stepwise in a predetermined direction in correspondence to the "mark" state of said digital signal while, in the second half, the phase of said transmission signal changes stepwise in a direction opposite to said predetermined direction to said reference phase value, and in correspondence to the "space" state of said digital signal the phase of said transmission signal is changed in a direction opposite to that in the case of the "mark" state of said digital signal, means for applying said digital signal to said producing means; and, means for demodulating said transmission signal to reproduce said digital signal and comprising:
means for dividing said transmission signal into two signals,
means for delaying one of said two signals relative to the other to produce a pair of relatively delayed signals, and
means for comparing said pair of relatively delayed signals to produce a signal representative of said digital signal.

2. A modem as in claim 1, wherein said transmitted signal is phase modulated in such a manner that said remaining portion of each said time slot is divided into a plurality of intervals, and the phase of said transmitted signal changes stepwise in a predetermined direction to a predetermined value in the front intervals and changes stepwise in a direction opposite to said predetermined direction to a reference value in rear intervals, and said phase change in said front intervals is set in a predetermined direction in correspondence to the "mark" state of said signal, and in a direction opposite to that in the case of the "mark" state in correspondence to the "space" state of said signal.

3. A modem system as in claim 1, wherein said delaying means relatively delays said two signals by the total time of said reference phase period.

4. A modem system as in claim 3, wherein said demodulating means forther comprises means receiving the output of said comparing means for converting said output into an NRZ digital signal.

5. A modem system as in claim 4, wherein said converting means comprises means for supplying the output of said comparing means to a switching input of a flip-flop, means for generating a synchronizing signal from the output of said flip-flop, and means for delaying said synchronizing signal and supplying it as a clock signal to a clock input of said flip-flop.

6. A modem system as in claim 5, wherein said synchronizing signal controls the relative delay provided between said two signals.

7. A modem system for digital data comprising,
means for producing a transmission signal which is phase-modulated in accordance with "mark" and "space" states of an applied digital signal in repetitive signal time slots, each of a predetermined duration, said transmission signal having a phase reference period of predetermined duration provided at at least one of the front and rear portions of each of said time slots during which said transmission signal assumes a reference phase value, and in the front half of the remaining period of each of said time slots a phase which changes for one of said states of said digital signal from said reference phase value to a predetermined value in a predetermined direction, while in the rear half of the remaining period, a phase which changes in the opposite direction back to said reference phase value, and in correspondence to the other state of said digital signal, only said reference phase value is formed over an entire time slot of said transmission signal; and means for applying said digital signal to said producing means.

8. A modem system for digital data comprising means for producing a transmission signal which is phase-modulated in accordance with "mark" and "space" states of an applied digital signal in repetitive signal time slots, each of a predetermined duration, said transmission signal having a phase reference period of predetermined duration provided at at least one of the front and rear portions of each of said time slots during which said transmission signal assumes a reference phase value, and in the front half of the remaining period of said time slots, a phase which changes for one of said states of said digital signal from said reference phase value to a predetermined value in a predetermined direction, while in the rear half of the remaining period, a phase which changes in the opposite direction back to said reference phase value, and in correspondence to the other state of said digital signal, only said reference phase part is formed over an entire time slot of said transmission signal, means for applying said digital signal to said producing means, and means for demodulating said transmission signal to reproduce said digital signal, said demodulating means comprising:

means for dividing said transmission signal into two signals, means for delaying one of said two signals relative to the other to produce a pair of relatively delayed signals, and means for comparing said pair of relatively delayed signals to produce a signal representative of said digital signal.

9. A modem system as in claim 8 wherein said demodulating means further comprises means receiving the output of said comparing means for converting said output into an NRZ digital signal.

10. A modem system as in claim 9, wherein said converting means comprising means for removing a DC component from the output of said comparing means, a comparator for comparing an output of said removing means with a preset value, and means responsive to the output of said comparator for providing an NRZ digital signal.

11. A modem system as in claim 10, wherein said providing means is a full wave rectifier.

12. A modem system for digital data, comprising:

means for producing a transmission signal which is phase modulated in accordance with "mark" and "space" states of an applied digital signal in repetitive signal time slots, each of a predetermined duration, said transmission signal having a phase reference period of predetermined time duration in total provided at at least one of the front and rear portions of each of said time slots during which said transmission signal assumes a reference phase value, and in the first half of the remaining portion of each said time slot the phase of said transmission signal changes stepwise in a predetermined direction in correspondence to the "mark" state of said digital signal while, in the second half, the phase of said transmission signal changes stepwise in a direction opposite to said predetermined direction to said reference phase value, and in correspondence to the "space" state of said digital signal the phase of said transmission signal is changed in a direction opposite to that in the case of the "mark" state of said digital signal, and, means for applying said digital signal to said producing means.

* * * * *